UNITED STATES PATENT OFFICE.

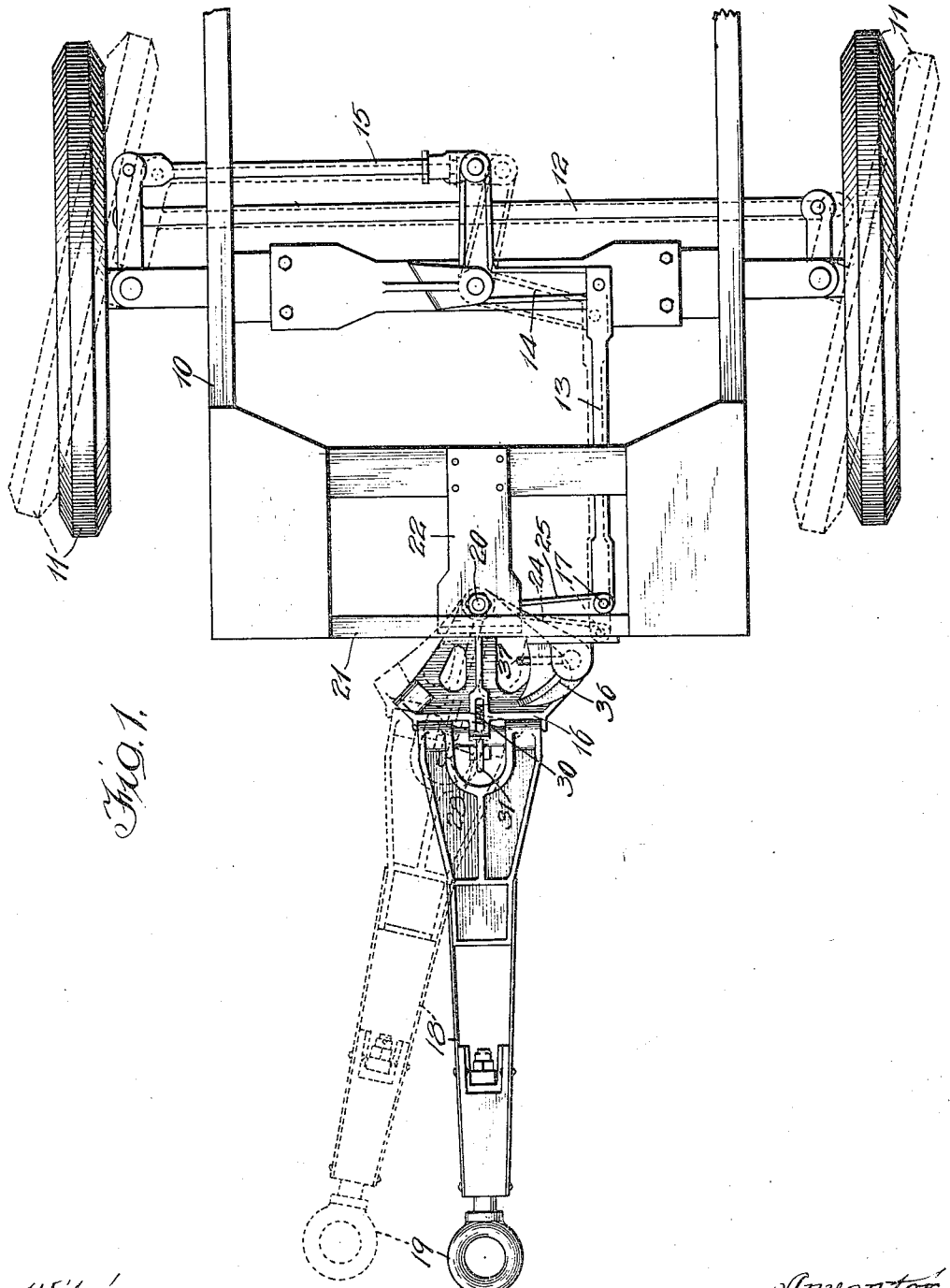

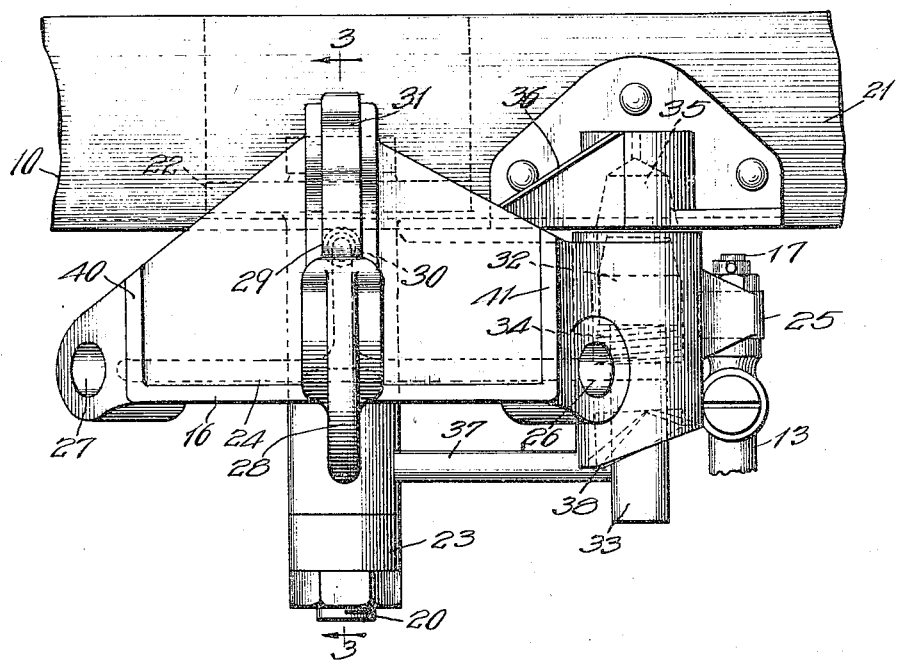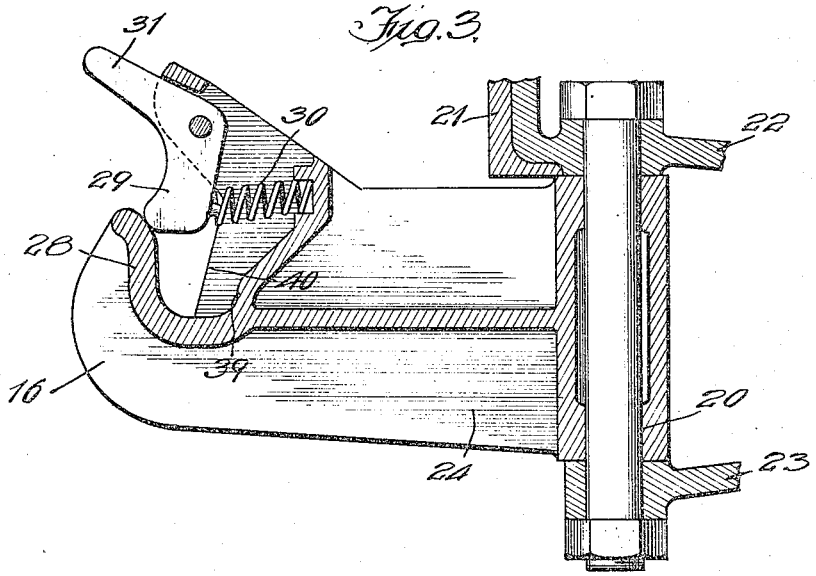

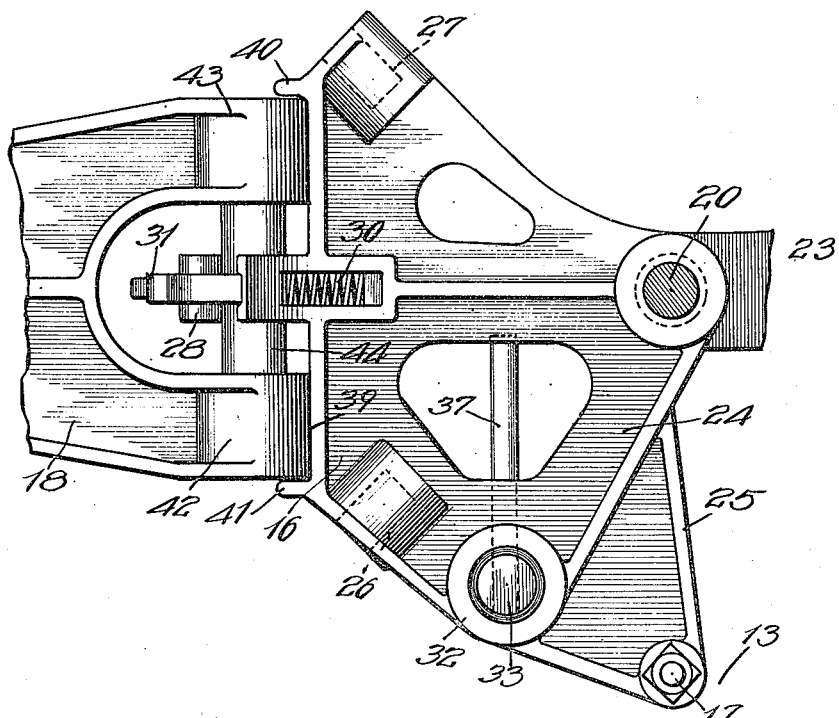
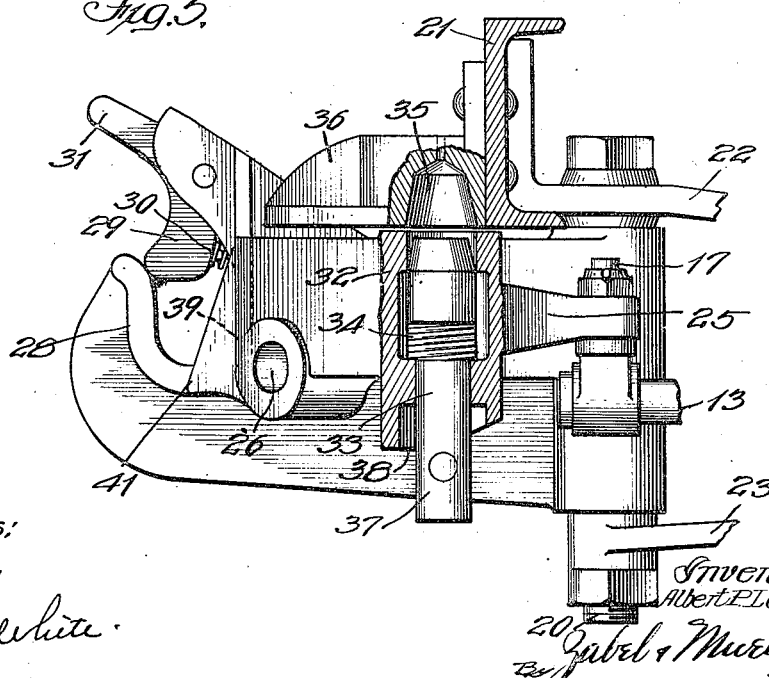

ALBERT PRESTON LEE, OF CHICAGO, ILLINOIS, ASSIGNOR TO LEE TRAILER & BODY CO., OF CHICAGO, ILLINOIS.

TRAILER CONNECTING-HEAD CONSTRUCTION.

1,412,120.     Specification of Letters Patent.    Patented Apr. 11, 1922.

Application filed April 12, 1919. Serial No. 289,489.

*To all whom it may concern:*

Be it known that I, ALBERT P. LEE, a citizen of the United States, residing at Chicago, in the county of Cook and State of Illinois, have invented a certain new and useful Improvement in Trailer Connecting - Head Constructions, of which the following is a full, clear, concise, and exact description, reference being had to the accompanying drawings, forming a part of this specification.

My invention relates to coupler heads for vehicles and more particularly to that type of head which is arranged to at times steer the front wheels in accordance with the movements of said head.

My invention has for its object the provision of a simple device of this character with mechanism whereby the head may be permitted to swing freely upon its pivotal mounting when it is desired to steer the wheels and whereby it is properly and effectively connected to the framework of the vehicle at such times when it is not desired to steer the wheels in accordance with the movements of the driving vehicle.

My invention is more particularly of service in connection with trailers, forming part of vehicle trains.

My invention further contemplates a structure so arranged that should the head be out of its central position and it be desired to have it automatically lock itself in its central position as it swings into said central position, that the provided instrumentalities may effect such operation automatically.

My invention further contemplates coupling arrangements of such a character that they can be utilized in connection with an ordinary eyelet provided upon the extremity of a draw bar or may be utilized in connection with a draw bar in such a manner that the draw bar may swing about its mounting upon a horizontal axis, but prevented from swinging about a vertical axis, thus that the attached draw bar may swing the coupler head and steer the wheels in accordance with the directive movements imparted thereto by the pulling or driving vehicle.

My invention further contemplates improved constructional features for the coupler head whereby the draw bar is held in place against dislodgment unless manually actuated means are brought into place to permit disconnection between the draw bar and the head.

I will explain my invention more in detail by referring to the accompanying drawings, in which—

Fig. 1 is a plan view of the front portion of a vehicle construction, my improved coupler head and a draw bar being attached thereto;

Fig. 2 is a front view of the coupler head;

Fig. 3 is a sectional view on line 3—3 of Fig. 2;

Fig. 4 is a top view of a coupler head showing it attached to the extremity of a draw bar, and Fig. 5 is a side view of the coupler head partly in section.

Referring more particularly to Fig. 1, I show a vehicle framework 10 carrying the front wheels 11, 11 suitably mounted upon steering knuckles and united by the tie rod 12. A steering rod 13 through the interposition of the lever 14 and link 15 steers the wheels 11 and determines their position in accordance with the position of the coupler head 16, the steering rod 13 being connected to the coupler head by means of the bolt or stud 17. The draw bar 18 having the eyelet 19 for attachment to a pulling vehicle is shown mounted upon the coupler head 16. The coupler head, as will be presently explained is pivotally mounted upon the bolt 20 so that as the draw bar 18 swings, it swings the coupler head and thereby steers the wheels, as indicated by the dotted position of the wheels, draw bar and associated parts in Fig. 1. Instrumentalities are provided, as will be presently explained, whereby the coupler head may be locked to the framework of the vehicle so as to prevent pivotal movement about a vertical axis of the coupler head, draw bar and wheels 11.

Referring now more particularly to Figs. 2, 3, 4 and 5, the vehicle framework includes a channel 21 to which is attached the supporting plate 22. This supporting plate together with the bracket 23 also secured to the framework of the vehicle, support the bolt 20 upon which the coupler head 16 is pivotally mounted. The coupler head 16 includes a casting 24 whose pivotal association with the bolt 20 will be more clearly apparent from an inspection of Fig. 3. This casting has the bracket 25 which carries the bolt 17 and through the agency of which the steering rod 13 is moved to and fro as the coupler head 16 swings about the bolt 20. The coupler head is likewise provided with sockets 26 and 27 so that this coupler head may by the insertion of a bolt into these sockets be rotated by hand when occasion requires. The coupler head is also provided at its forward extremity with a finger 28 which may receive the ordinary eyelet, if desired, of a common draw bar. In the manner in which this structure is generally used, however, a specially constructed draw bar is utilized, as will presently appear. This finger 28 co-operates with a dog 29 backed by the spring 30 to normally prevent an eyelet or bolt which has been inserted from leaving its position within the finger 28. A finger piece 31 permits manipulation of the dog 29 against the action of the spring 30 so that a draw bar eyelet of the common variety or of the style presently to be explained may be withdrawn or uncoupled. The coupler head 16 likewise has a socket 32 within which a bolt 33 is mounted backed by the spring 34 which has a tendency to press this bolt upwardly. This bolt is designed to at times co-operate with the socket 35 carried by the bracket 36. The bracket 36 is rigidly mounted upon the channel iron 21 and has an enlarged bottom face. The bolt 33 has an extending rod 37, which rod co-operates with a cam surface 38. Whenever the rod 37 is in the position shown in Fig. 2, then the bolt 33 is withdrawn from the socket 35. Whenever the rod 37 is swung around, however, so as to permit the bolt to travel upwardly, then the bolt 33 engages the socket 35 when it is aligned therewith and locks the coupler head 16 against the framework of the machine so that said coupler head no longer rotates or swings about the bolt 20. The enlarged lower face of the bracket or shaft 36 at all times covers the opening of the socket 32 so that the bolt can at no time swing upwardly unless it is in alignment with the socket 35. This is of advantage under those conditions where the coupler head has been swung out of its central position and it is desired to have it automatically lock itself in its central position when said coupler head is swung about by the pulling vehicle. Under those conditions the rod 37 is swung about so that the bolt 33 is free to move in answer to the actuation of the spring 34 just as soon as the bolt 33 aligns itself with the socket 35. The coupler head 16, as more clearly apparent from Figs. 2 and 4 has a flat front face 39 extending between the webs 40 and 41, this front face being to the rear of the coupling finger 28. This front face together with the webs 40 and 41 thus provide a pocket which co-operates with hubs 42 and 43 forming part of the draw bar 18. These hubs 42 and 43 carry the coupler pin 44, which coupler pin is carried normally by the finger 28 and held against withdrawal by the dog 29. The hubs 42 and 43 are rounded so that the draw bar may swing at all times about the axis of the pin 44. No swinging around of said draw bar in a horizontal plane relatively to the head 16 is permitted, however, by reason of the fact that the finger 28 abuts the pin 44 and the hubs 42 and 43 abut the front face 49 of the coupler head 39, the webs 40 and 41 of course preventing sidewise displacement of the draw bar relative to the coupler head. In this manner the draw bar 18, when the coupler head is disengaged from the framework of the vehicle, swings the coupler head in answer to the swinging movement of said draw bar about a vertical axis. The position of the wheels 11 of the vehicle is therefore dependent upon the angular position occupied by said draw bar in a horizontal plane relative to the longitudinal axis of the vehicle. As before explained, the finger 28 is so designed that it may be engaged by the ordinary eyelet, such as the eyelet 19, but is also capable of co-operating with the draw bar extremity such as that shown more clearly in Fig. 4. It must of course be understood that where merely an eyelet is used, then the coupler head 16 cannot be used for steering purposes.

From what has been thus described the nature of my invention will be clearly understood. It will also be understood that changes and modifications may be made within the scope of the appended claims without departing from the spirit of my invention.

Having however thus described one form which my invention may take, what I claim as new and desire to secure by Letters Patent is:

1. A structure of the character described comprising a vehicle framework, a coupler head pivoted on said framework, a steering rod controlled by said coupler head, means for at will locking said head to said framework, and a coupler finger carried by said coupler head at the extreme forward end thereof, said coupler finger being adapted to co-operate with an eyelet, said head having means at each side of said finger adapted to co-operate with said finger to hold a draw bar against rotation relatively to the head about a vertical axis.

2. A structure of the character described comprising a vehicle framework, a coupler head pivoted on said framework, a steering rod controlled by said coupler head, means for at will locking said head to said framework, a coupler finger carried by said coupler head at the extreme forward end thereof adapted to co-operate with an eyelet, said finger having spring controlled means to detachably maintain a draw bar extremity in position upon said finger, and webs at the sides of the finger and cooperating with the finger to support a draw bar on said head.

3. A structure of the character described comprising a vehicle framework, a coupler head swingingly mounted upon said framework, a steering rod controlled by said coupler head, a bolt carried by the head and engaging a socket in the frame work for at will locking said head to said framework, and a coupler finger carried by said coupler head at the forward extremity thereof adapted to co-operate with an eyelet, spring controlled means to maintain a draw bar extremity in position upon said finger, said coupler head having means on either side for attaching a rod whereby it may be manually rotated.

4. A steering coupler head for vehicles comprising a body portion pivoted on said framework forwardly of the axle, and a coupler finger at the forward extremity of said coupler head adapted to cooperate with a substantially circular eyelet or with a draw bar, said body portion being provided with a socket adapted to receive a removable rod therein, whereby it may be manually rotated.

5. A structure of the character described comprising a vehicle framework, a coupler head swingingly mounted upon a vertical pivot on said framework, a steering rod controlled by said coupler head, a plunger adapted to enter a socket in said frame work for at will locking said head to said framework, a cam to withdraw the plunger as the plunger is rotated, and a coupler finger carried by said coupler head adapted to co-operate with an eyelet.

6. A structure of the character described comprising a vehicle framework, a draw bar having a horizontally disposed pin at the end thereof, a coupler head swingingly mounted upon said framework, a steering rod controlled by said coupler head, spring pressed means for at will locking said head to said framework, and a coupler finger carried by said coupler head at the forward extremity thereof whereby said coupler finger is adapted to cooperate with an eyelet, said coupler head being adapted to co-operate with said finger, and having means rearwardly of said finger to hold said draw bar against lateral movement and rotation relatively to the head about a vertical axis.

7. A structure of the character described comprising a vehicle framework, swingingly mounted wheels therefor, a coupler head swingingly mounted upon said frame work and provided with a finger at the free end thereof, connections between said head and wheels whereby said wheels are swung in response to the movements of said head, means for at will locking said head to said framework, a draw bar adapted to be connected with said finger, and means on said head rearwardly of said finger and at opposite sides thereof whereby said draw bar is held against swinging movement relatively to the head about a substantially vertical axis when mounted thereon.

In witness whereof, I hereunto subscribe my name this 31st day of March, A. D. 1919.

ALBERT PRESTON LEE.